US012539242B2

(12) United States Patent
Wright et al.

(10) Patent No.: US 12,539,242 B2
(45) Date of Patent: Feb. 3, 2026

(54) APPARATUS FOR USE IN ASSISTING A PERSON WITH LIMITED MOBILITY IN ENTERING AND EXITING AN AIRCRAFT

(71) Applicants: Donald Wright, Duncan (CA); Darren Aitchison, Duncan (CA)

(72) Inventors: Donald Wright, Duncan (CA); Darren Aitchison, Duncan (CA)

( * ) Notice: Subject to any disclaimer, the term of this patent is extended or adjusted under 35 U.S.C. 154(b) by 499 days.

(21) Appl. No.: 17/533,098

(22) Filed: Nov. 22, 2021

(65) Prior Publication Data

US 2022/0160563 A1 May 26, 2022

(51) Int. Cl.

*A61G 7/10* (2006.01)
*A61G 3/02* (2006.01)
*A61G 3/06* (2006.01)
*B64F 1/30* (2006.01)

(52) U.S. Cl.

CPC ............. *A61G 7/1059* (2013.01); *A61G 3/02* (2013.01); *A61G 3/062* (2013.01); *A61G 7/1005* (2013.01); *A61G 7/1015* (2013.01); *A61G 7/1042* (2013.01); *B64F 1/30* (2013.01)

(58) Field of Classification Search

CPC ...... A61G 7/1042; A61G 7/1059; A61G 3/02; A61G 3/062; A61G 7/1005; A61G 7/1015; B64F 1/30; B66B 9/08; B66B 9/083

See application file for complete search history.

(56) References Cited

U.S. PATENT DOCUMENTS 3,500,963 A * 3/1970 Beutler ................... B66B 9/083 187/289
4,564,086 A * 1/1986 Kingston ............... A61G 3/063 414/921
5,193,650 A * 3/1993 Kent, Jr. ................. B66B 9/083 198/326
8,550,215 B2 * 10/2013 Linton .................. B66B 9/0853 187/202
8,696,017 B2 * 4/2014 Wright ................... A61G 7/103 280/47.38
9,499,282 B1 * 11/2016 Weaver ................... B64F 1/315
11,167,954 B2 * 11/2021 Smith ................... B66B 9/0815
2002/0104714 A1 * 8/2002 Jakes ...................... A61G 3/062 187/242
2008/0093176 A1 * 4/2008 Rosenthal ............... B66B 9/083 187/241
2015/0013059 A1 * 1/2015 Kelly ................... A61G 7/1005 4/496
2017/0066462 A1 * 3/2017 Wright ................. A61G 7/1019

FOREIGN PATENT DOCUMENTS

JP 3662497 B2 * 6/2005 ............. A47C 7/465
WO WO-2006122574 A1 * 11/2006 ........... A61G 7/1005

* cited by examiner

*Primary Examiner* — Minh Truong
*Assistant Examiner* — Michelle M Mudwilder

(57) ABSTRACT

An apparatus for use in boarding a person onto a seat of an aircraft or vehicle, or lowering a person into a pool, which includes a ramp, a top mount, a bottom mount, a carriage assembly, and a mechanism for moving the carriage assembly. The ramp has a first end and a second end. The top mount is removably attached to the first end and has a mounting panel and base support. The mounting panel is pivotally connected to the base support and configured to be locked in a pivoted position. The bottom mount is removably attached to the second end. The carriage assembly is removably mountable on to the ramp. The hoist assembly is configured to move the carriage assembly up and down the ramp.

18 Claims, 15 Drawing Sheets

APPARATUS FOR USE IN ASSISTING A PERSON WITH LIMITED MOBILITY IN ENTERING AND EXITING AN AIRCRAFT

FIELD OF THE INVENTION

The present invention relates to the field of devices for use in assisting people with limited mobility, namely, with respect to entering and exiting float planes, airplanes, other aircraft, vehicles, as well as pools.

SUMMARY OF THE INVENTION

The present invention is an apparatus for assisting a person with limited mobility to enter float planes, airplanes, other aircraft or vehicles. The apparatus includes a ground support, a rail assembly, a top mount, a carriage assembly, and a mechanism for moving the carriage assembly from the bottom of the rail assembly to the top of the rail assembly. The carriage assembly is comprised of a seat, a swivel mount, and a conveyor cart.

In some embodiments, the carriage assembly is moved up and down the rail assembly by a hoist mechanism comprised of a reel, a removable handle for the reel and a cord.

In some embodiments, the carriage assembly is moved up and down the rail assembly by a linear actuator comprised of a guide rail with a u-shaped extrusion containing a lead screw that is turned by a worm gear that is driven by an electric motor. In this embodiment, the direction the carriage assembly moves on the rail assembly is determined by a switch that controls the direction that the motor spins.

In some embodiments that seat is fully collapsible in order to make it easier to transport from one spot to the next.

In some embodiments the seat is made as one solid component save for one armrest that remains collapsible to aid in unloading people into the aircraft or pool. This same embodiment contains a control on the non-collapsible arm rest in order to control the electric motor that moves the carriage assembly up and down the ramp.

In the embodiment for entering a pool, the top and bottom mount of the assembly are different in that the top mount is formed of a single piece with the mounting panel having feet extending laterally from each side. The bottom mount is comprised of a cylindrical tube that forms a footing that rests on the bottom of the pool.

In some embodiment, the carriage assembly includes a backrest, a seat bottom, two armrests, two armrest panels, and a leg rest. The backrest may be pivotally attached to the seat bottom by a pivot bolt. The armrests may be attached to the backrest with a pivot bolt and each armrest contains a slot on its underside to engage with the armrest panel. The armrest panels may include both a main panel and a panel flap and the panel flap is pivotally connected to the main panel with a hinged joint that allows up to a 180-degree pivot. The leg rest may comprise an extension frame and a foot plate. The leg rest may be connected to the seat bottom with a hinged joint. The seat may be collapsed into a compact unit.

In some embodiments the swivel mount comprises a plate mounted on the support column of the carriage assembly, a second plate mounted on the underside of the seat; a series of bearings interposed between the plates, a curved plate with holes mounted on the side of the first plate, a lock pin contained in a lock pin housing, and a lock pin housing mounted to the underside of the seat that allows a lock pin to slidably engage with the holes in the curved plate.

In some embodiments the swivel mount comprises a ring gear connected to the carriage seat, a worm gear connected to the carriage assembly that interfaces with the ring gear, a shaft connected to the worm gear and a crank connected to the shaft to rotate the worm gear whereby rotation of the worm gear translates to rotation of the carriage seat relative to the carriage assembly.

In some embodiments, the conveyor cart comprises a frame with two plates forming side walls attached to a hollow rectangular top, plates attached to the rectangular top separate and parallel from the plates that form the frame and attached to the frame plates by a bottom retaining plate, bearing wheels mounted within the space between each of the parallel plates by a shaft that extends through each of the plates, two seat support panels extending upward from the side walls and attached by a pivot bolt to a support column suspended by said pivot bolt between the two support panels, one of the seat support panels being fitted with a locking bolt that passes through the seat support and into one of a series of holes on the side of the support column.

In some embodiments, the mechanism configured to move the carriage assembly up and down the ramp comprises a reel attached to a mounting plate, a handle removably attached to the reel, and a cable or cord extending from the reel and attached to the carriage assembly.

In some embodiments, the mechanism configured to move the carriage assembly up and down the ramp comprises a hand or motor driven lead screw mounted parallel to the ramp, and a threaded block mounted on the conveyor cart through which the lead screw passes, and which travels along the lead screw as the lead screw rotates in one direction or another.

In one aspect, the present invention provides an apparatus for use in boarding a person onto a seat in an aircraft or vehicle, comprising: a ramp member with a first end and a second end; a top mount connected to the first end to engage a portion of a floor of the aircraft or vehicle adjacent the seat; a bottom mount attached to the second end to engage a surface near the plane or vehicle; a carriage assembly moveably mounted on the ramp member to travel along a length of the ramp member; a drive mechanism cooperating with the carriage assembly to move the carriage assembly; and a carriage seat connected to the carriage assembly to support the person, the carriage assembly and ramp member cooperating to maintain the carriage seat in a plane perpendicular to a longitudinal axis of the ramp member as the carriage assembly travels along the ramp member In some embodiments, the apparatus may further comprise a swivel mechanism between the carriage assembly and the carriage seat to enable the carriage seat to swivel relative to the carriage assembly in a horizontal plane.

In some embodiments, the apparatus may further comprise a backrest and side support panels on the carriage seat, a hinge connecting each side support panel to the carriage seat to enable the side support panel to be folded down into coplanar alignment with a seat surface of the carriage seat, and a side panel latching mechanism to selectively engage and unengaged the side support panel to the back support.

In some embodiments, the swivel mechanism comprises an adjustment plate connected to the carriage assembly and having a plurality of holes, and a pin connected to the carriage seat and being moveable to reciprocate into one of the plurality of holes to lock the carriage seat in a position relative to the carriage assembly.

In some embodiments, the swivel mechanism comprises a ring gear connected to the carriage seat, a worm gear connected to the carriage assembly that interfaces with the ring gear, a shaft connected to the worm gear and a crank connected to the shaft to rotate the worm gear whereby rotation of the worm gear translates to rotation of the carriage seat relative to the carriage assembly.

In some embodiments, the drive mechanism comprises a cable connected to the carriage assembly and wound on a winch at the first end that is operable to take in and let out the cable to move the carriage assembly.

In some embodiments, the drive mechanism comprises a lead screw spanning a length of the ramp and being driven to rotate in both directions, and a female threaded member carried on the lead screw, the female threaded member being connected to the carriage assembly to move the carriage assembly along the ramp as the threaded female member moves along the driven lead screw.

In some embodiments, the ramp member comprises two parallel tubular rails. In some embodiments, each tubular rail comprises rod members releasably connected end to end to enable disassembly of the tubular rails.

In some embodiments, the rod members each further comprise a male end with spring-loaded buttons, and a female end operable to receive the male end of an adjacent rod member, the female end including a hole configured to receive the spring-loaded button of said male end.

In some embodiments, the carriage assembly further comprises wheels that ride on the tubular rails and a retainer mechanism to maintain the carriage assembly on the tubular rails and thereby prevent the carriage assembly from unintentionally dismounting the ramp member.

In some aspects, the present invention provides an apparatus to raise and lower a person into and out of a swimming pool comprising: a ramp member with a first end and a second end; a top mount connected to the first end to rest on portion of a deck adjacent the pool, a bottom mount attached to the second end to rest on a bottom of the pool; a carriage assembly moveably mounted on the ramp member to travel along a length of the ramp member; a drive mechanism cooperating with the carriage assembly to move the carriage assembly; a carriage seat connected to the carriage assembly to support the person, the carriage assembly and ramp member cooperating to maintain the carriage seat in a plane perpendicular to a longitudinal axis of the ramp member as the carriage assembly travels along the rail member; and a swivel mechanism between the carriage assembly and the carriage seat to enable the carriage seat to swivel relative to the carriage assembly in a horizontal plane In some embodiments, the swivel mechanism comprises a ring gear connected to the carriage seat, a worm gear connected to the carriage assembly that interfaces with the ring gear, a shaft connected to the worm gear and a crank connected to the shaft to rotate the worm gear whereby rotation of the worm gear translates to rotation of the carriage seat relative to the carriage assembly.

In some embodiments, the drive mechanism comprises a cable connected to the carriage assembly and wound on a winch at the first end that is operable to take in and let out the cable to move the carriage assembly.

In some embodiments, the drive mechanism comprises a lead screw spanning the length of the ramp member and being driven to rotate in both directions, and a female threaded member carried on the lead screw, the female threaded member being connected to the carriage assembly to move the carriage assembly along the ramp as the threaded female member moves along the driven lead screw.

In some aspect, the present invention provides, an apparatus for use in boarding a person onto a seat in an aircraft or vehicle, comprising: a ramp with a first end and a second end; a top mount removably attached to the first end, the top mount having a mounting panel and base support, the mounting panel being pivotally connected to the base support and configured to be locked in a pivoted position; a bottom mount removably attached to the second end; a carriage assembly removably mountable on the ramp; and a drive mechanism to move the carriage assembly up and down the ramp.

In some embodiments, the ramp comprises separate rod members releasably connected end to end, each with a male end with spring-loaded buttons, and a female end with a hole configured to receive the spring-loaded buttons.

In some embodiments, the top mount comprises a mounting panel and a base support.

DETAILED DESCRIPTION

Figure 1:
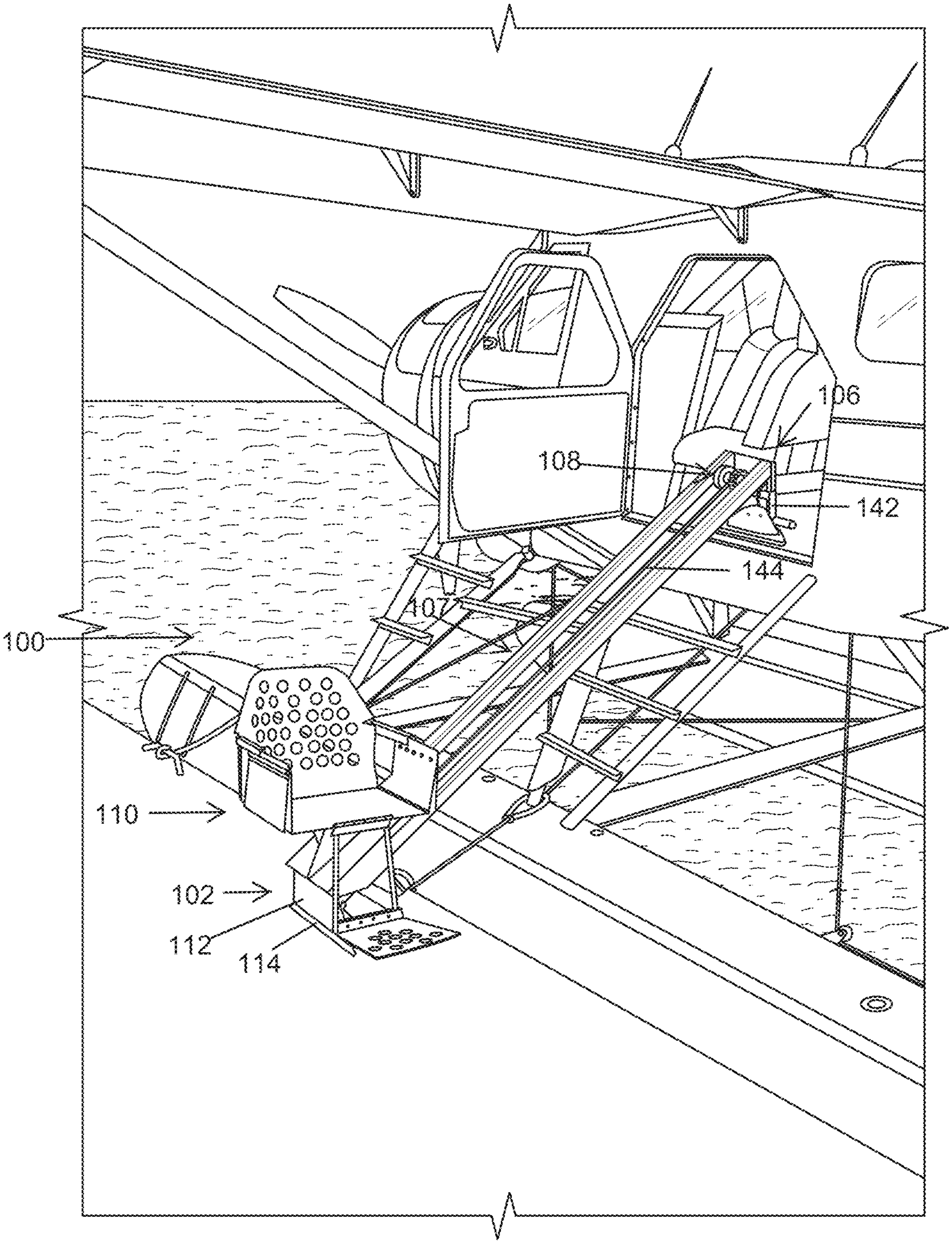
FIG. 1 is a drawing of one embodiment of the invention fully assembled.
Figure 2:
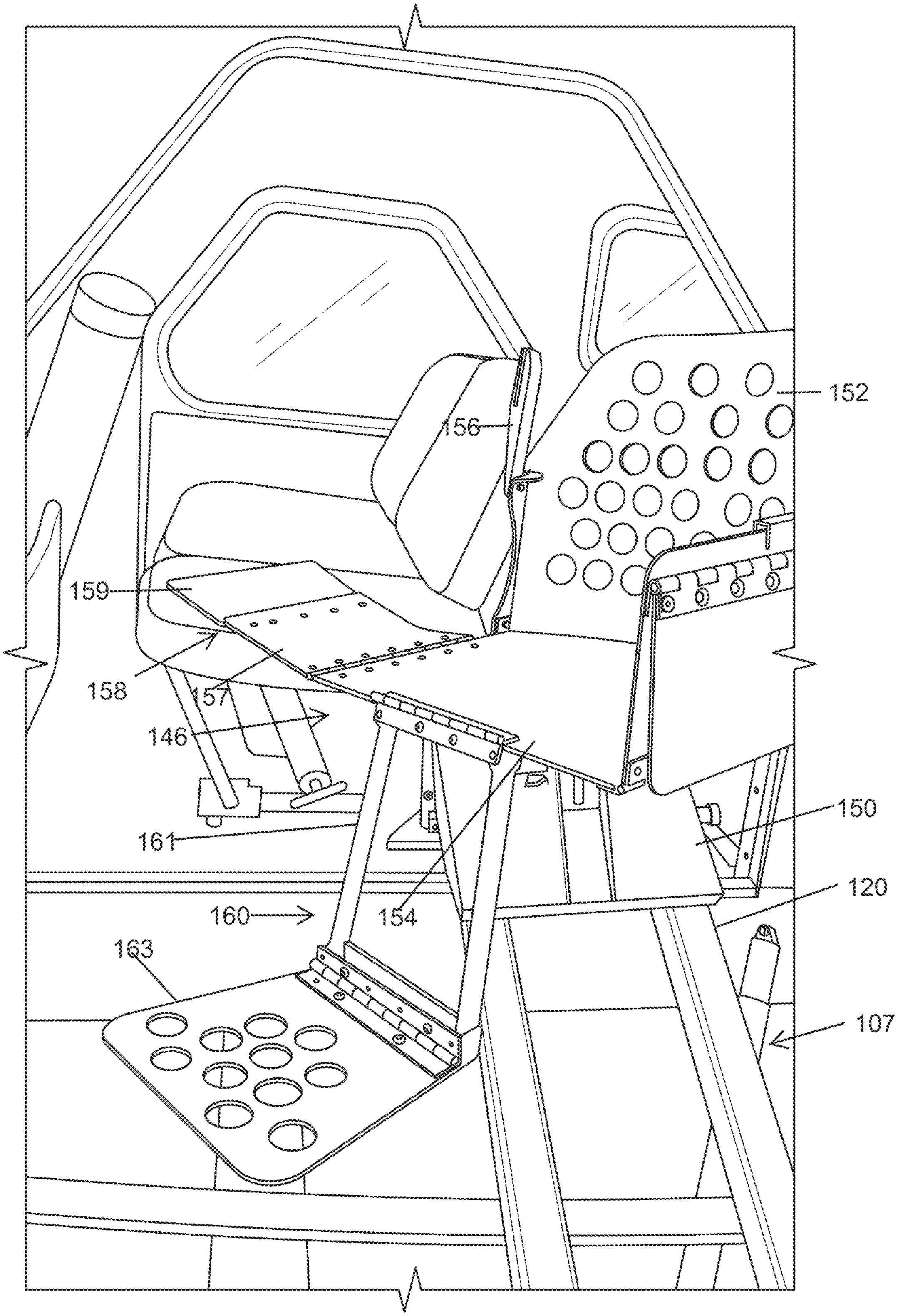
FIG. 2 shows the embodiment in FIG. 1 setup to unload a passenger from the seat into a plane.
Figure 3:
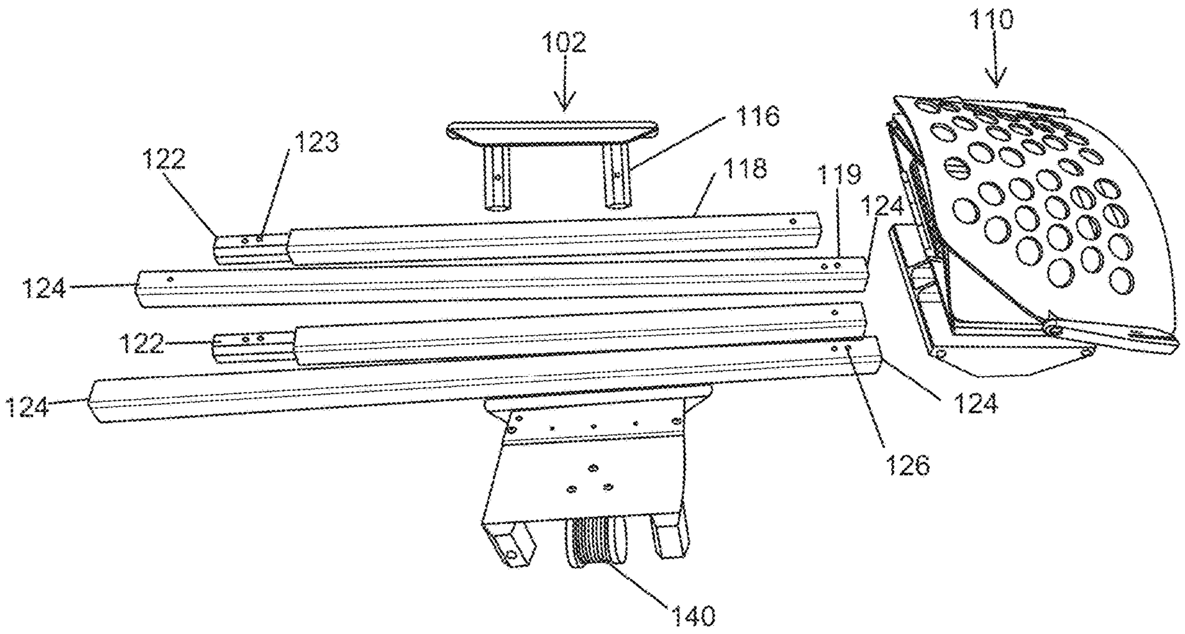
FIG. 3 shows the rail assembly, bottom mount, and reel assembly in disassembled form as well as the carriage cart detached from the rails with the seat in its collapsed position.
Figure 4:
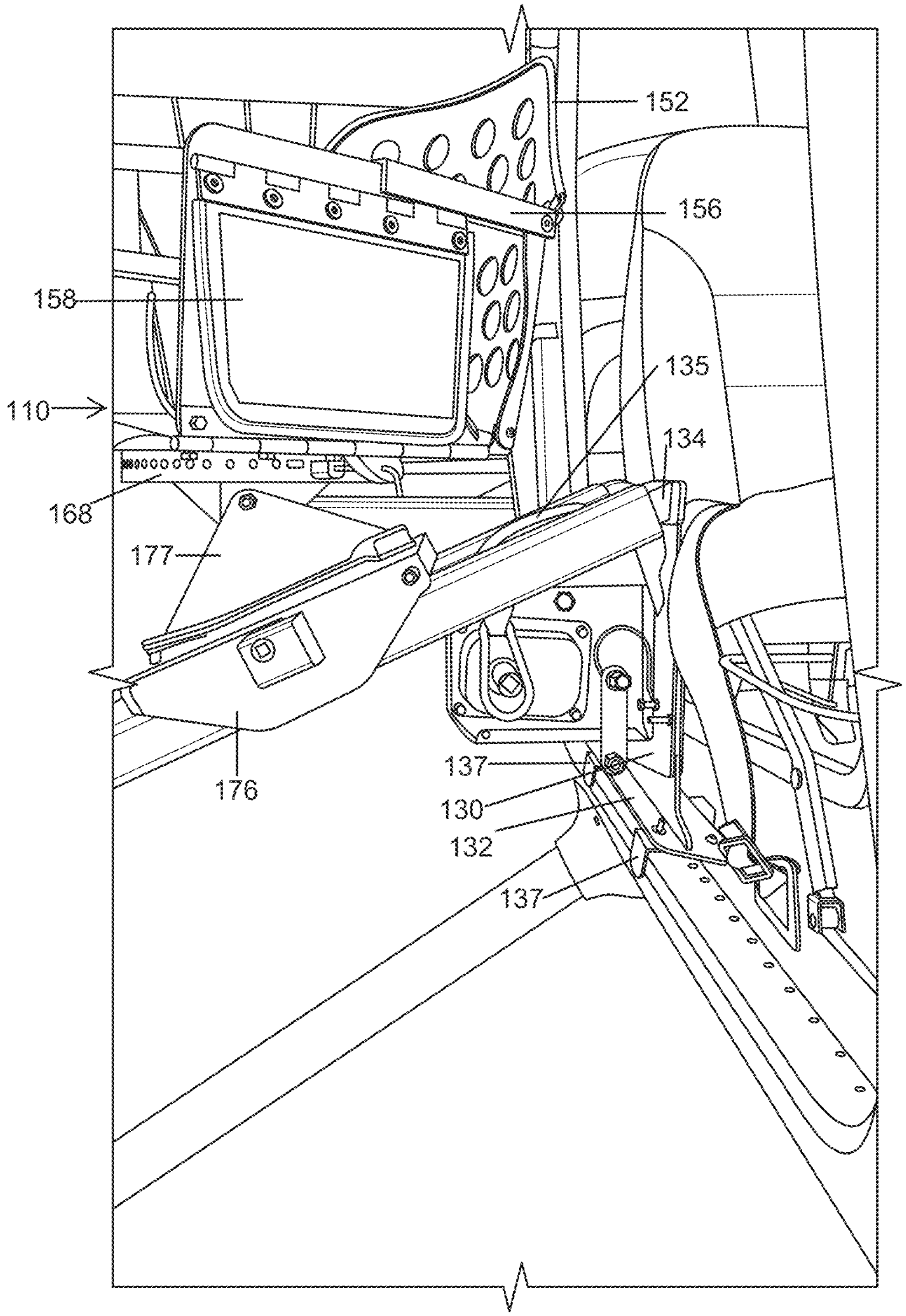
FIG. 4 shows the top mount of the rail assembly as attached to a plane doorway with the rail assembly attached and carriage cart at the top of the ramp.
Figure 5:
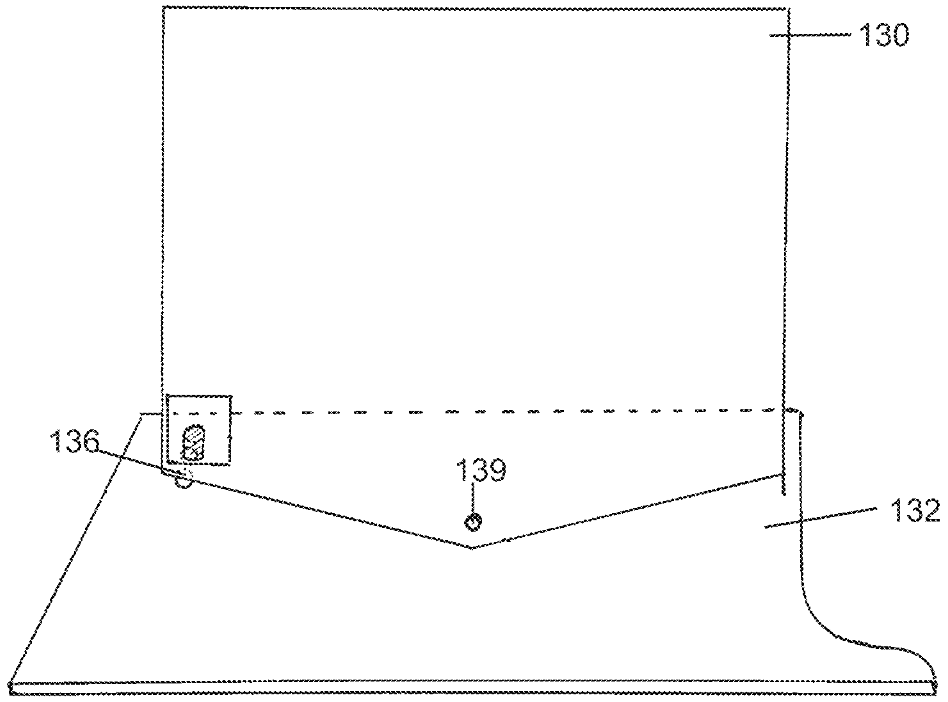
FIG. 5 shows the tilt mechanism for positioning the top mounting plate.
Figure 6:
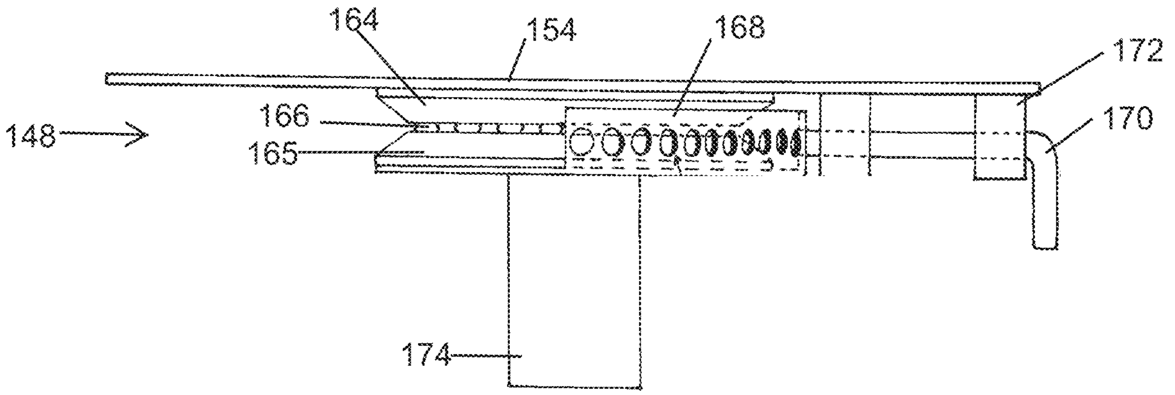
FIG. 6 shows an embodiment of a swivel mount.
Figure 7:
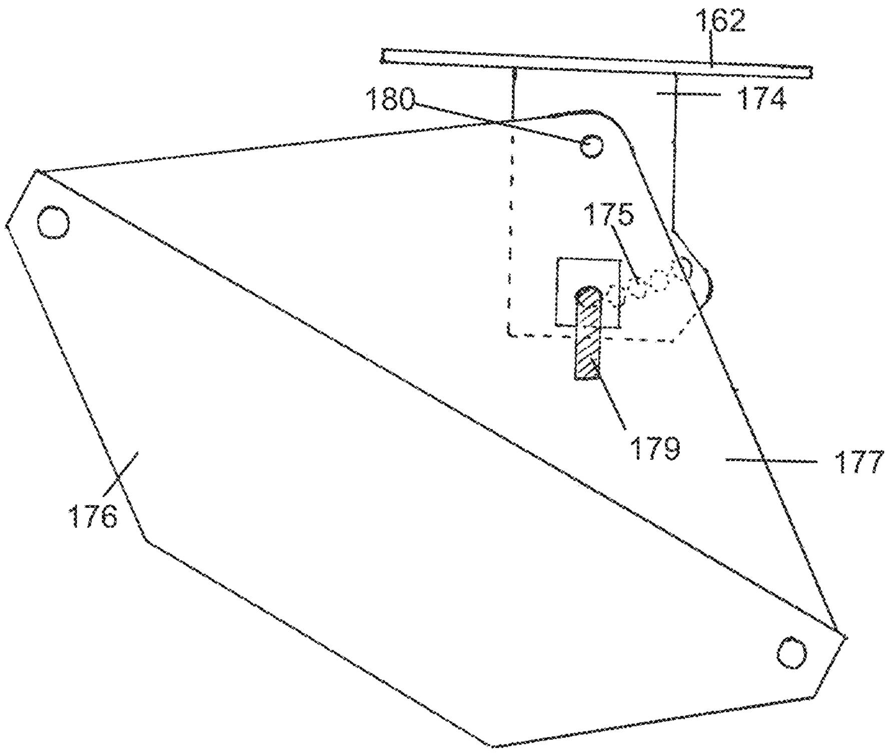
FIG. 7 shows the tilt mechanism for the support column attached to the conveyor cart.
Figure 8:
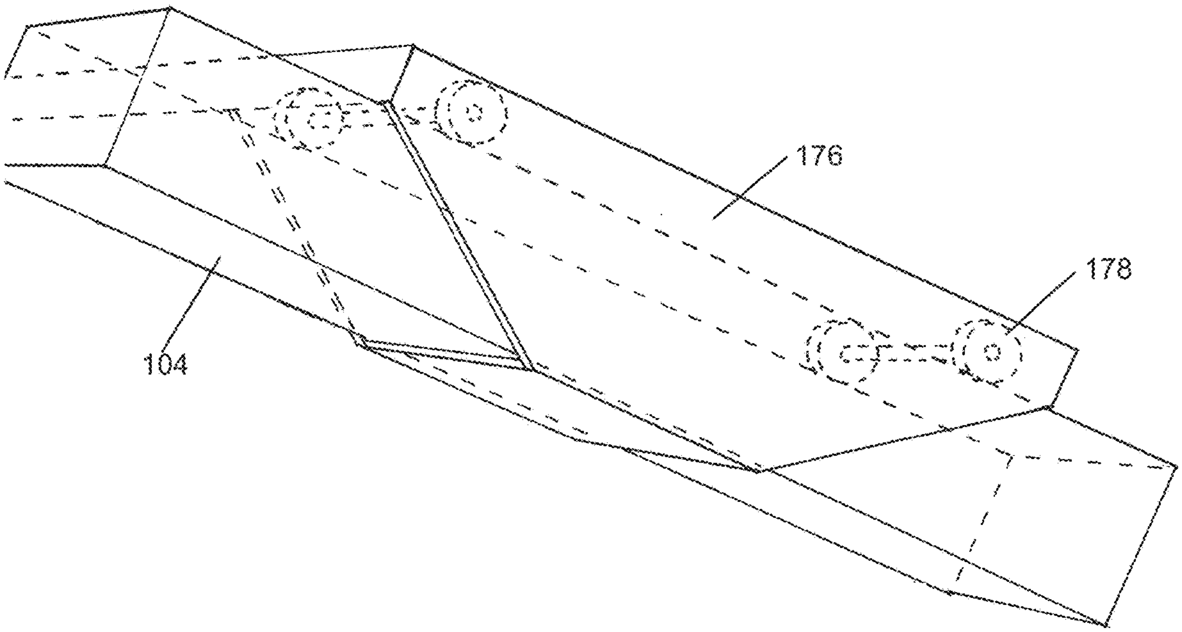
FIG. 8 show one embodiment of the conveyor cart mounted on the ramp.
Figure 9:
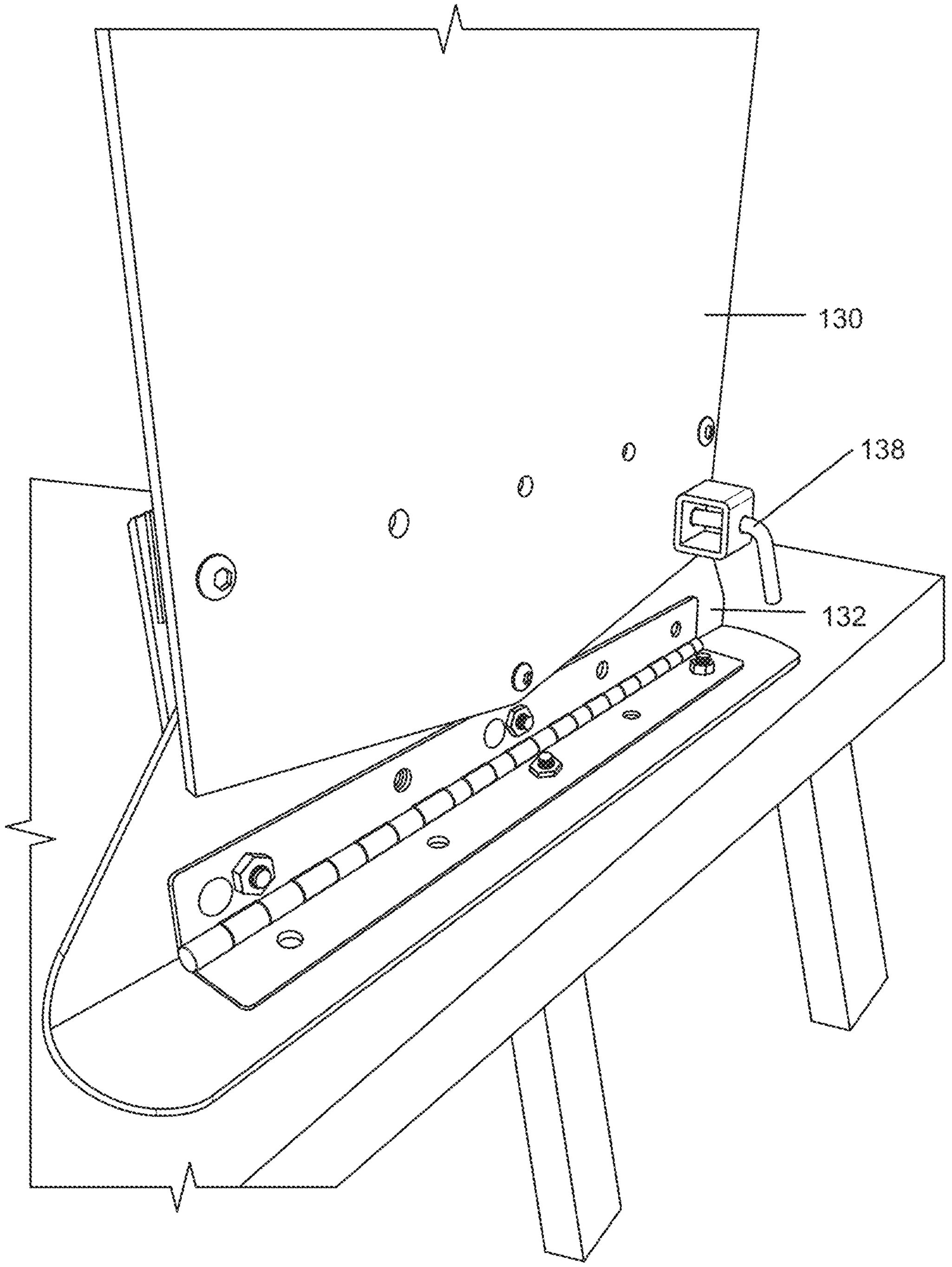
FIG. 9 shows another view of the tilt mechanism for positioning the top mounting plate.
Figure 10:
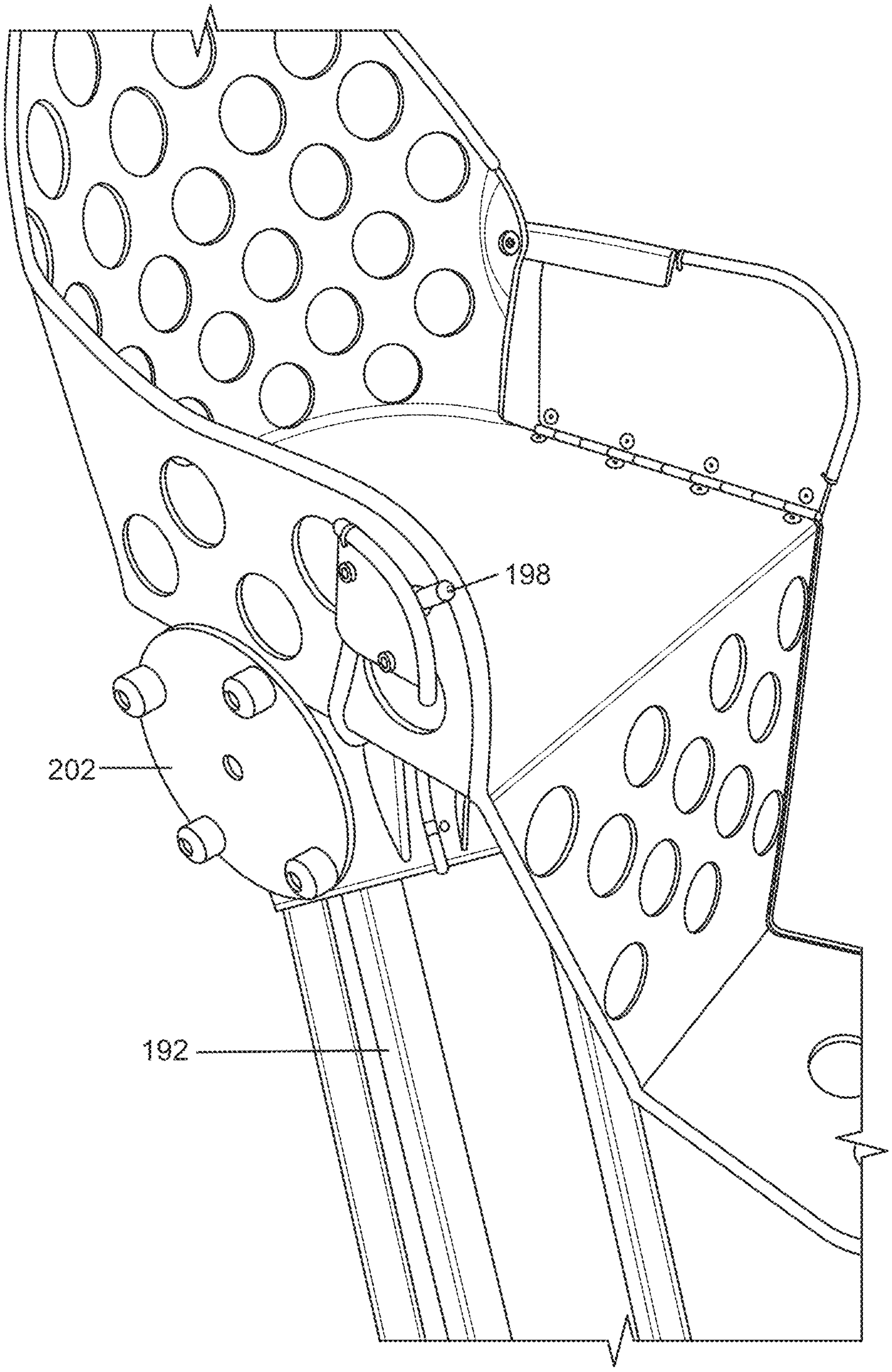
FIG. 10 shows the seat of an alternate embodiment of the invention where the seat moves along a guide rail via a linear actuator.
Figure 11:
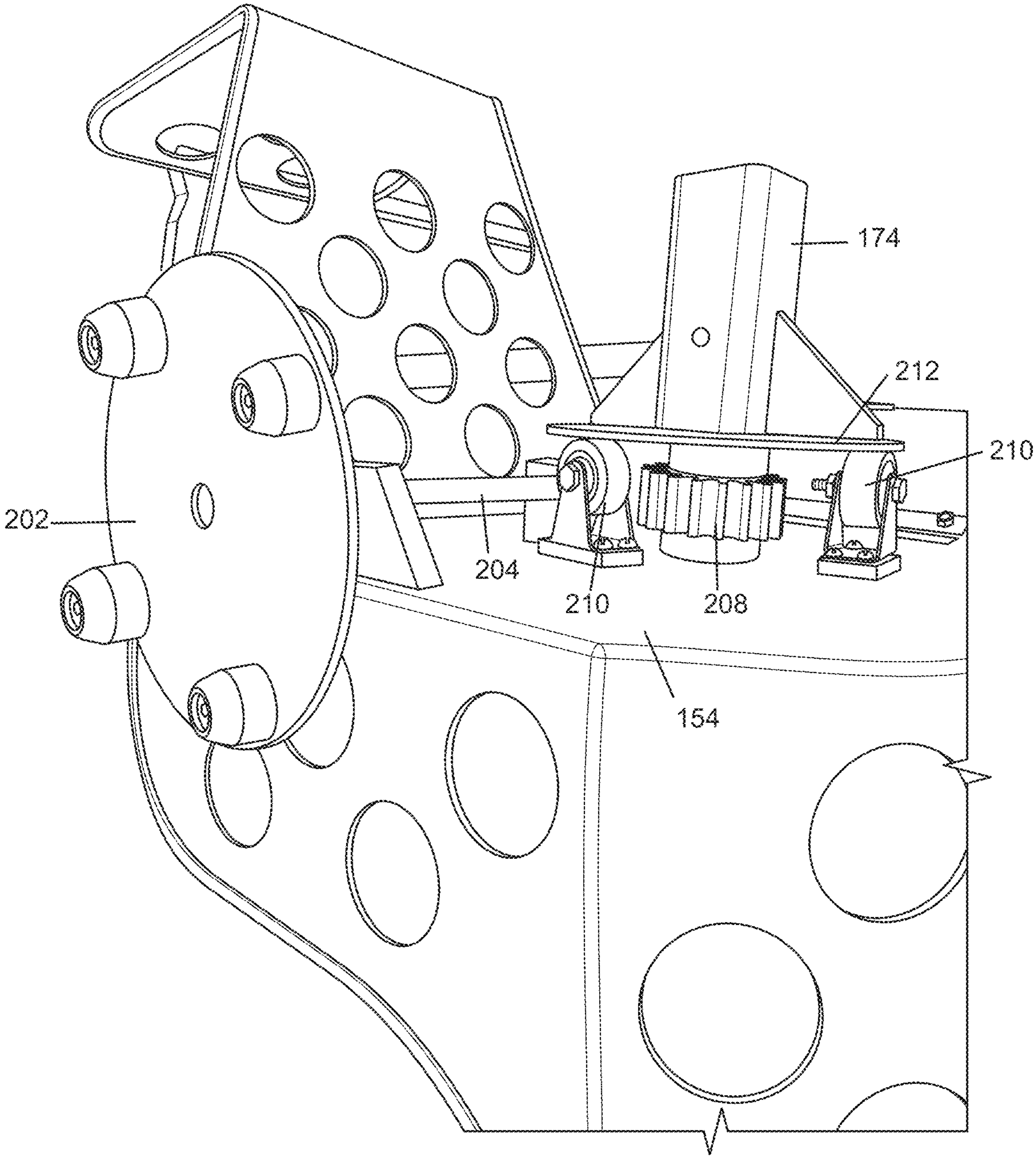
FIG. 11 shows an alternate embodiment of the swivel mechanism.
Figure 12:
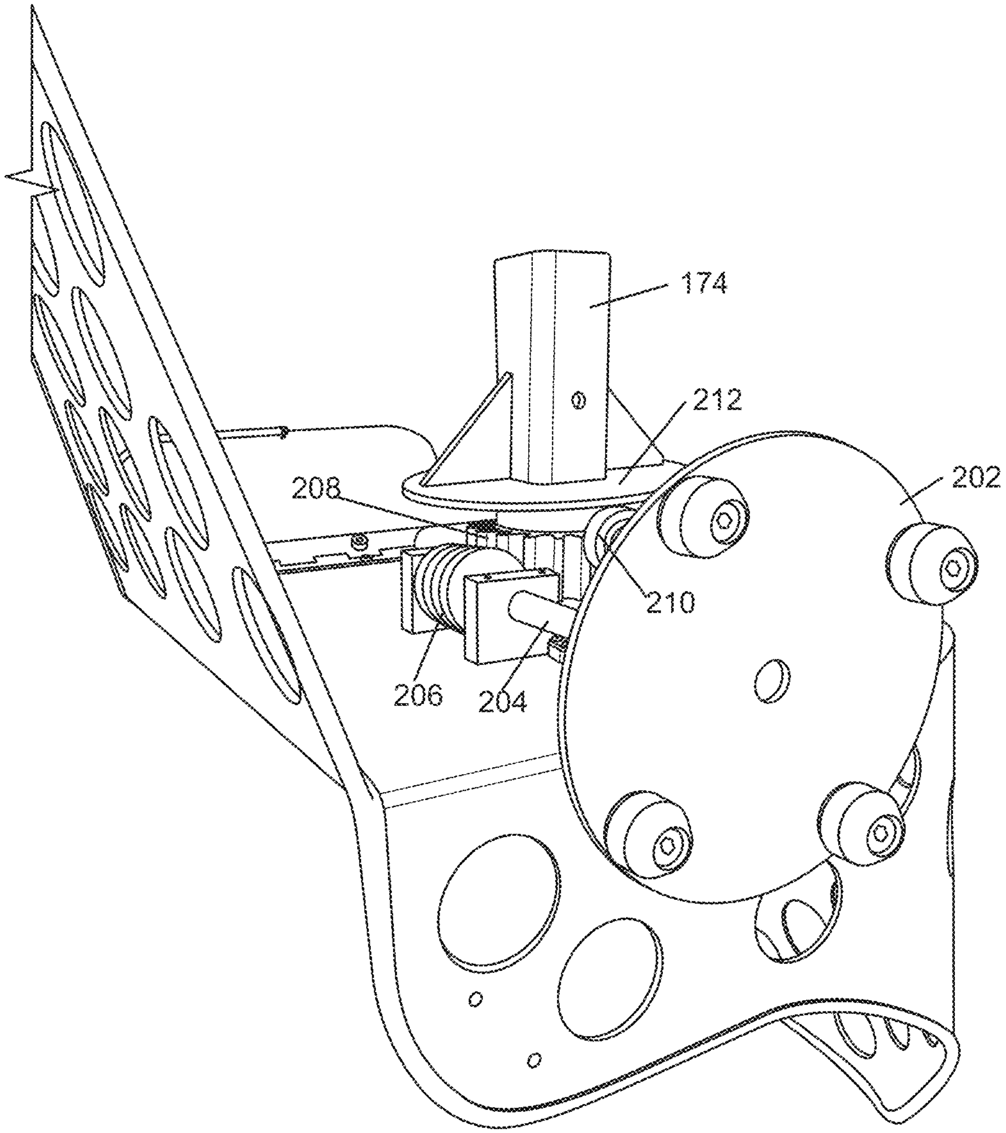
FIG. 12 shows another view of the alternate embodiment of the swivel mechanism in FIG. 11.
Figure 13:
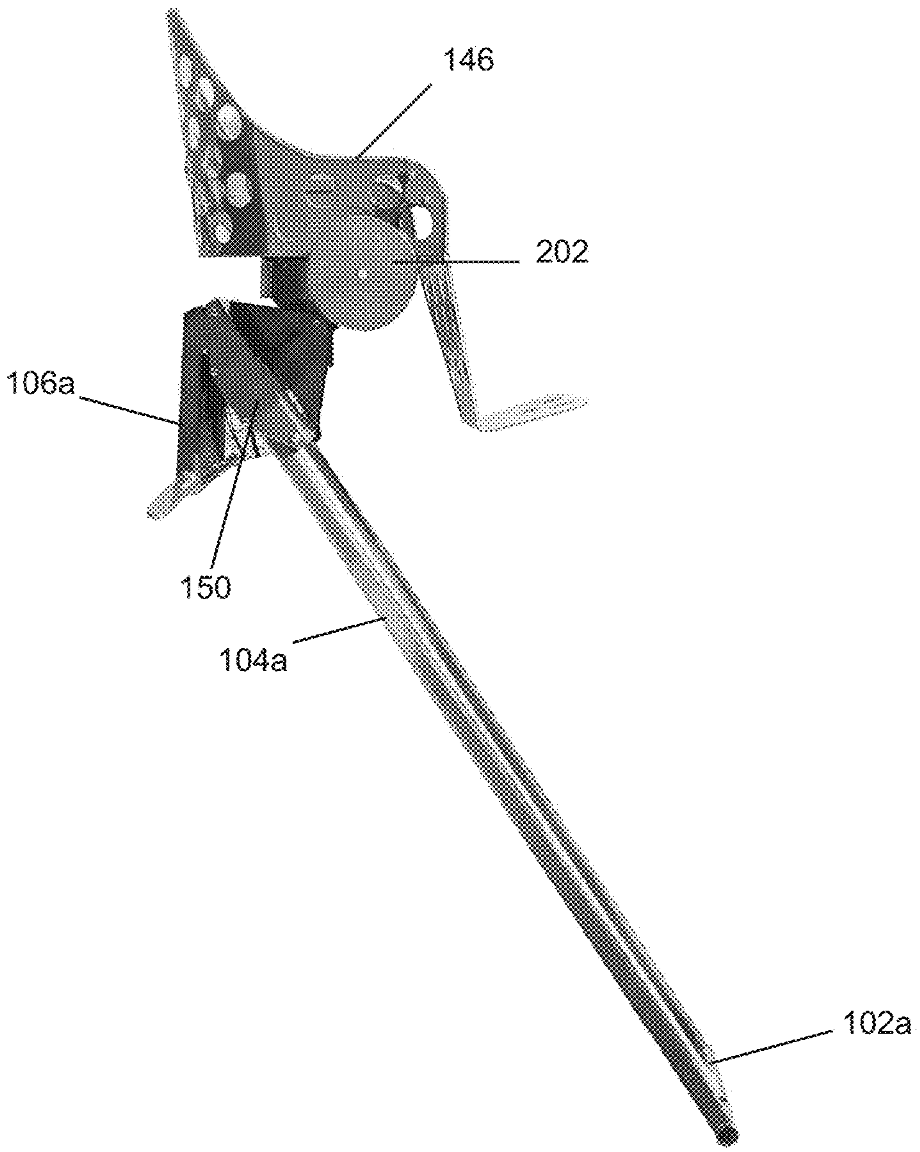
FIG. 13 show an alternative embodiment of the present invention suitable for use in pools.
Figure 14:
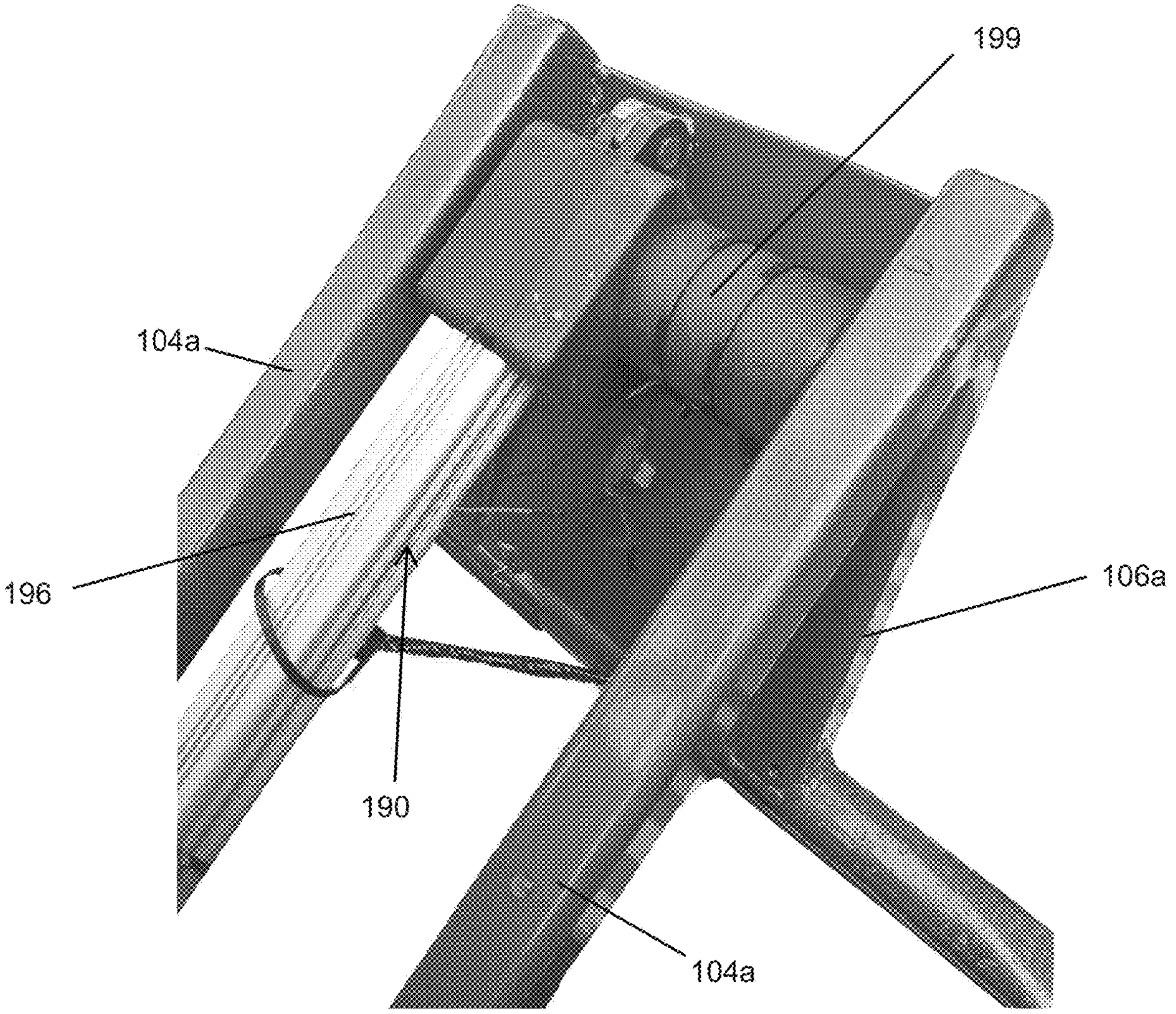
FIG. 14 is a closeup view of the top portion of the embodiment in FIG. 13.
Figure 15:
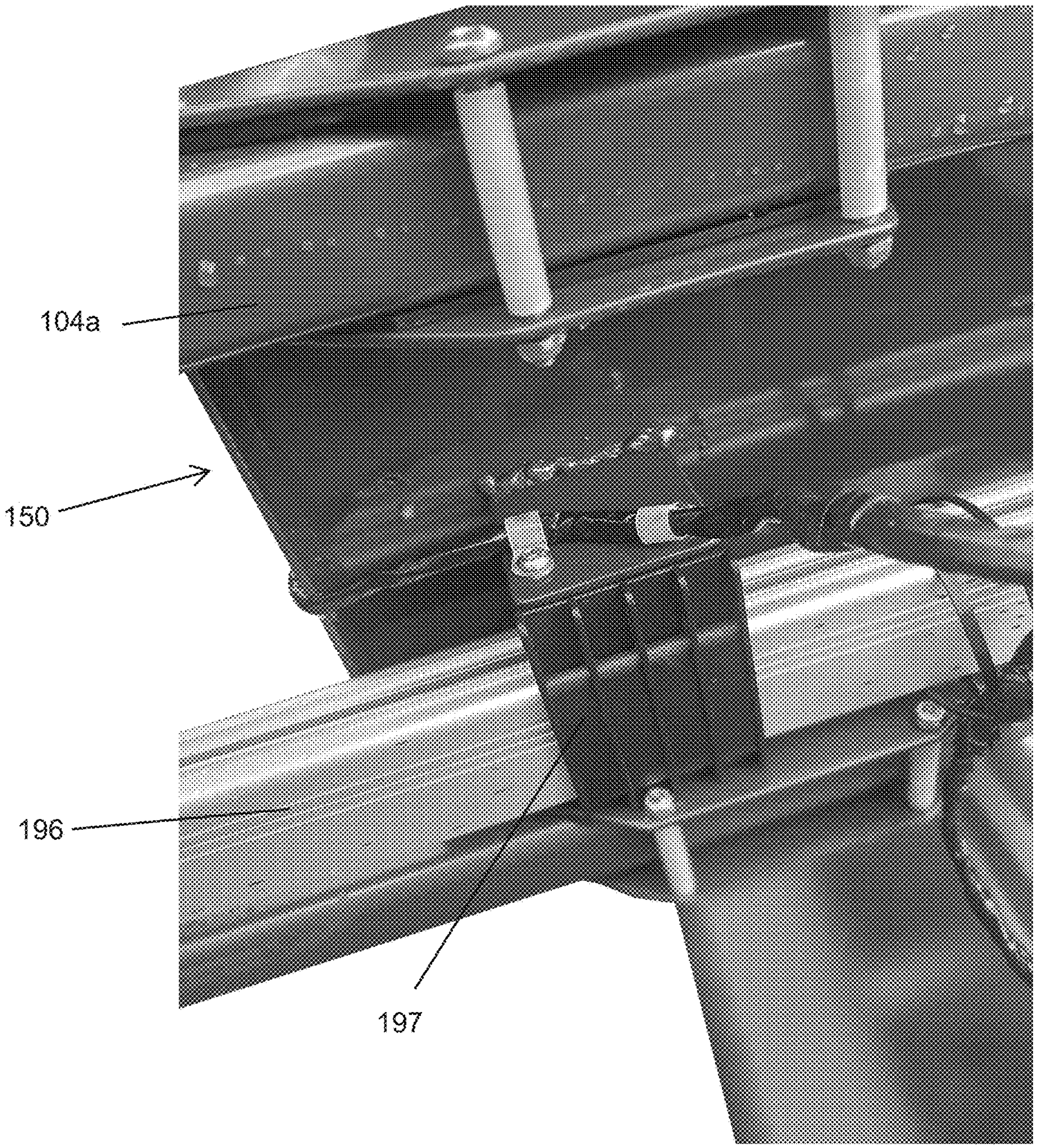
FIG. 15 is a closeup view from the bottom showing the carriage cart, ramp members and guide rail.

As shown in the Figures, embodiments of the present invention include a boarding device 100 having: a ground support 102, a rail assembly 104, a top mount 106, a hoist assembly 108, and a carriage assembly 110.

Ground support 102 includes a flat plate 112 having a perpendicular planar surface 114 on the bottom edge and two prongs 116 configured to mate with rail assembly 104 projecting from the top edge. Prongs 116 include a spring-loaded button engagement 117 configured to engage with rail assembly 104.

Rail assembly 104 includes two short rod members 118 and two long rod members 119 that interconnect to form two rails 120. Each short rod member 118 has a male connector end 122 and a female connector end 124. Both short rod members 118 have two spring-loaded button engagements 123 on male connector end 122, and a hole 115 for receiving a corresponding spring-loaded button engagement on female connector end 124. Each long rod member 119 has a female connector end 121 on both ends. Both long rod members 119 have holes 126 on both ends for receiving a corresponding spring-loaded button engagement. Rails 120 are configured to mate with prongs 116 at one end and with top mount 106 at the opposite end. Hole 115 on male connector end 122 on short rod member 118 is configured to engage with spring-loaded button engagement 117 on prongs 116. Holes 126 on long rod member 119 is configured to engage with a spring-loaded button engagement on top mount 106.

Top mount 106 includes a mounting panel 130 pivotally coupled to a base support 132. Mounting panel 130 is pivotally coupled to a base support 132 by a pivot bolt 139 or any other suitable fastener. Mounting panel 130 includes two male receptacles 134 configured to engage with female connector end 121 of long rod members 119. Male receptacles 134 project from the top of mounting panel 130 at a slight downward angle. Optionally, a protective cover 135 is bolted to the top of mounting panel 130. A series of adjustment holes 136 run along one side of mounting panel 130 from just underneath male receptacles 134 to the bottom. A first lock pin 138 is provided on one side of mounting panel 130 in an adjustment hole 136. Base support 132 includes holes for attaching detachable legs 137 using screws and wingnuts. Detachable legs 137 are configured to clasp on to the ledge of an aircraft entryway or the doorway of a vehicle and enhance stability of top mount 106.

When assembled, ground support 102, rail assembly 104, and top mount 106 form ramp 107.

Hoist assembly 108 includes a reel 140, a removable handle 142 for use in actuating the reel 140, and a cable or cord 144. Cord 144 extends from reel 140 and attaches to carriage assembly 110. Cord 144 includes a connector at the distal end for releasable attachment to carriage assembly 110. Reel 140 is attached to the center of mounting panel 130 below and in between male receptacles 134.

Carriage assembly 110 includes a seat 146, a swivel mount 148, and a conveyor cart 150. Seat 146 includes a backrest 152, a seat bottom 154, two armrests 156, two armrest panels 158, and a leg rest 160. Backrest 152 is pivotally connected to seat bottom 154 with a pivot bolt. Each armrest 156 is pivotally connected to back rest 152 with a pivot bolt. Each armrest panel 158 includes a main panel 157 and a panel flap 159. Panel flap 159 is pivotally connected to main panel 157 with a hinged joint that will only allow up to a 180 degrees pivot. Each armrest 156 has a slot on the underside configured to engage with main panel 157 and to hold main panel 157 in an upright position. Leg rest 160 includes an extension frame 161 and a foot plate 163. Leg rest 160 is pivotally connected to seat bottom 154 with a hinged joint. All components of seat 146 are configured to be foldable and collapsible into a compact unit. Although the shown embodiment is illustrated with all metal components, it will be understood by a person skilled in the art that different materials may be used (e.g., cloth and foam for seat bottom 154, and plastic for the armrests, backrest, etc.).

Swivel mount 148 includes a column mounting plate 162, a top swivel plate 164, a bottom swivel plate 165, swivel plate bearings 166, a curved adjustment plate 168, a lock pin 170, a lock pin housing 172, and a support column 174. Swivel plates 164 are mounted to the underside of seat bottom 154. Column mounting plate 162 is mounted to the underside of the bottom swivel plate 165. Swivel plate bearings 166 are interposed between top swivel plate 164 and bottom swivel plate 165. Lock pin housing 172 is mounted to the underside of seat bottom 154 and is configured to slidably hold lock pin 170 in place to engage with curved adjustment plate 168. Curved adjustment plate 168 is attached to bottom swivel plate 165. Curved adjustment plate 168 has an array of spaced holes configured to receive lock pin 170. Support column 174 is attached to column mounting plate 162 at one end and pivotally connected to conveyor cart 150 at the opposite end. Support column 174 includes a curved array of holes 175 arranged to provide selected angular orientations at the end pivotally connected to conveyor cart 150.

Conveyor cart 150 includes a cart frame 176, two seat support panels 177, conveyor bearings 178, and a cord receiver. Seat support panels 177 are mounted on to cart frame 178 in an upright position, are spaced apart and configured to receive and be pivotally connected to support column 174 with a pivot bolt. Seat support panels 177 include adjustment holes 175 configured to receive a third lock pin 179 and to allow for angular adjustment of support column 174 relative to seat support panels 177. Conveyor bearings 178 are connected to the underside of cart frame 176 and configured to engage with rails 120. The cord receiver is located on to the underside of cart frame 176.

In use, boarding device 100 can be transported in its component parts as described above (and shown in the figures) and assembled at the usage site. Rail assembly 104 can be assembled together by connecting short rod members 118 with long rod members 119. Short rod members 118 can be connected to long rod members 119 by sliding male connector ends 122 into female connector ends 121. Short rod members 118 connected to long rod members 119 in this manner forms rails 120. At one end, rails 120 can then be connected with prongs 116 on ground support 102 by sliding female connector end 124 on to prongs 116. On the other end, rails 120 can be connected with male receptacles 134 on top mount 106 by sliding male receptacles 134 into female connector end 121. Once ground support 102 is connected to top mount 106 with rail assembly 104, ramp 107 for boarding device 100 is assembled. Planar surface 114 on ground support 102 lies flat on the ground or boarding platform. Base support 132 of top mount 106 rests on the ledge of an entryway to an aircraft or vehicle. If used, detachable legs 137 clasp on to the ledge of the entryway to enhance stability of ramp 107. The angular orientation of top mount 106 may then be adjusted so that the top of top mount 106 is parallel to the top of ground support 102. The angular orientation of top mount 106 is adjusted by pivoting mounting panel 130 left and right until the top of top mount 106 is level with the top of ground support 102 and locking mounting panel 130 in this desired position by inserting first lock pin 138 into the corresponding adjustment hole 136 on mounting panel 130. When the top of top mount 106 is parallel to the top of ground support 102, rails 120 will be level with each other, thereby providing a level surface for carriage assembly 110 to travel on.

Once ramp 107 is assembled as described above, carriage assembly 110 can be set on ramp 107. To do so, rails 120 are disconnected with ground support 102 and cart frame 176 is slid on to rails 120 in an upright position such that conveyor bearings 178 engage with rails 120. Once cart frame 176 is set on to rails 120, rails 120 are connected with ground support 102.

Once carriage assembly 110 is set in place on ramp 107, carriage assembly 110 may be connected to top mount 106 via hoist assembly 108. To do so, cord 144 is attached to the cord receiver with a connector.

Once carriage assembly 110 is set in place on ramp 107 and connected to hoist assembly 108, an operator may assist a user to board an aircraft or vehicle using boarding device 100. To do so, the operator would first set up seat 146 in a position to allow the user to move on to seat 146. Seat 146 can be set up by unfolding backrest 152 into an upright position, then unfolding main panel 157 into an upright position, followed by bringing armrests 156 down to engage the slot underneath with main panel 157 (thereby locking the main panel in an upright position), and finally unfolding leg rest 160. The forward and backward tilt of seat 146 may then need to be adjusted so that the user may sit in a substantially horizontal position. The forward and backward tilt of seat 146 can be adjusted by pivoting seat 146 forwards and backwards and locking seat 146 in the desired position by inserting third lock pin 179 through the appropriate adjustment holes in seat support panels 177 and support column 174. Once seat 146 is set up as described, the user would be moved on to seat 146. An operator would then assist the user in swiveling and locking seat 146 to the side such that leg rest 160 does not interfere with rails 120. To swivel seat 146 to the left and right, the operator would manipulate seat 146 by turning it to the left or the right. Swivel plates 164 would allow seat 146 to turn as per the direction of force. Once the desired position is reached, the operator would insert second lock pin 170 into a hole in curved adjustment plate 168 to lock seat 146 in the desired position. The operator would then use removable handle 142 to engage reel 140 to begin hoisting carriage assembly 110 up ramp 107 towards the elevated aircraft or vehicle entryway. Once carriage assembly 110 has been hoisted up to the aircraft or vehicle entryway, the user or operator would fold armrest 156 up to release main panel 157 on the side nearest the seat. The user or operator would then unfold armrest panels 158 such that main panel 157 and panel flap 159 are extending across to contact the seat. The operator can then assist the user in sliding him/herself over main panel 157 and panel flap 159 and on to the seat. Once the above-described boarding process is completed, the operator may dismantle boarding device 100 back into its component parts for storage and transportation.

An alternate embodiment of the invention includes a motorized lead screw that is within a u-shaped extrusion of a guide rail 196 and engages with a threaded block 197 attached to the bottom of the conveyor cart 150 to move the carriage assembly 110 along the rail assembly 104. The lead screw is driven by an electric motor 199 mounted to the top mount 106*a* which drives the lead screw via appropriate gearing. The direction the lead screw 190 turns may be controlled by the direction of the motor or via appropriate gearing, thereby enabling control to move the seat assembly up or down the ramp. The direction that the motorized lead screw moves in turn changing the linear direction that the block 197 moves along the lead screw, hence the direction in which carriage assembly 150 moves, either up or down rail assembly 104*a*.

An alternate embodiment of the invention includes a crank wheel 202 mounted on the side of the seat 146 that turns a shaft 204 that passes through the underside of the seat bottom 154 and is attached to a worm gear 206 that interacts with a toothed wheel 208 in order to swivel the seat 146. The seat 146 has three bearing wheels 210 attached to its bottom that are placed equidistance from each other and interact with a swivel plate 212 attached to the support column 174 that attaches to conveyor cart 150.

An alternate embodiment of the invention allows for the invention to be used as a means for lifting people in and out of pools. This embodiment of the invention includes a top mount made of a single component comprised of a mounting plate with feet that extend laterally on either side and a bottom mount that is comprised of a cylindrical tube attached to the rail assembly In this specification, the following reference numbers are used with the following terms:

boarding device 100
ground support 102
rail assembly 104
top mount 106
ramp 107
hoist assembly 108
carriage assembly 110
flat plate 112
perpendicular planar surface 114
hole 115
prongs 116
short rod members 118
long rod members 119
rails 120
female connector end 121
male connector end 122
spring-loaded button engagement 123
female connector end 124
holes 126
mounting panel 130
base support 132
male receptacle 134
protective cover 135
adjustment holes 136
detachable legs 137
first lock pin 138
pivot bolt 139
reel 140
removable handle 142
cord 144
seat 146
swivel mount 148
conveyor cart 150
backrest 152
seat bottom 154
armrests 156
main panel 157
armrest panels 158
panel flap 159
leg rest 160
extension frame 161
column mounting plate 162
foot plate 163
swivel plate 164
swivel plate bearings 166
curved adjustment plate 168
second lock pin 170
lock pin housing 172
support column 174
curved array of holes 175
cart frame 176
seat support panels 177
conveyor bearings 178
third lock pin 179
second pivot bolt 180
motorized lead screw—190
guide rail—196
switch—198
crank wheel—202
shaft—204 worm gear—206
toothed wheel—208
bearing wheel—210
swivel plate—212

The scope of the claims should not be limited by the preferred embodiments set forth in the examples but should be given the broadest interpretation consistent with the description as a whole.

What is claimed is:

1. A collapsible boarding device for use in boarding a person onto a seat in an aircraft or vehicle, comprising:

a ramp member with a first end and a second end, the ramp member comprising two parallel rails, each rail of the parallel rails comprising a plurality of tubular members releasably connected end to end to enable disassembly of the parallel rails;

a top mount releasably connected to the parallel rails at the first end, the top mount being operable to engage a portion of a floor of the aircraft or vehicle adjacent the seat;

a bottom mount releasably connected to the parallel rails at the second end and being operable to engage a surface near the aircraft or vehicle;

a carriage assembly releasably mounted on the parallel rails, the carriage assembly being configured to travel along the parallel rails on a top surface of the parallel rails, the carriage assembly further being configured to envelop a bottom surface of the parallel rails to impede unintentional disengagement of the carriage assembly from the parallel rails;

a drive mechanism cooperating with the carriage assembly to move the carriage assembly;

a carriage seat connected to the carriage assembly to support the person, the carriage seat includes a backrest and a side panel assembly on each side of the carriage seat, each side panel assembly comprises a main panel and a panel flap, wherein the main panel is hinged to a seat surface and the panel flap is hinged to the main panel;

the side panel assembly is foldable between an upright configuration in which the panel flap is in parallel abutment to the main panel and the main panel is perpendicular to the seat surface, and a flat configuration in which the panel flap is unfolded away from and in coplanar alignment with the main panel and the main panel is unfolded away from and in coplanar alignment with the seat surface;

in the flat configuration, the panel flap may be rested on the seat of the aircraft or vehicle to enable the person to slide from the seat surface of the carriage seat onto the main panel and the panel flap and onto the seat of the aircraft or vehicle;

the backrest is foldable toward the seat surface, and each side panel assembly is further foldable toward the seat surface to enable the carriage seat to collapse for storage; and wherein the collapsible boarding device may be collapsed for storage when the carriage assembly, the top mount, and the bottom mount are each released from the parallel rails, and the parallel rails are disassembled into the plurality of tubular members.

2. The collapsible boarding device of claim 1 wherein the carriage seat includes a foldable footrest configured to fold underneath the seat surface to enable the carriage seat to collapse for storage.

3. The collapsible boarding device of claim 1 further comprising a swivel mechanism between the carriage assembly and the carriage seat to enable the carriage seat to swivel relative to the carriage assembly in a horizontal plane.

4. The collapsible boarding device of claim 3 wherein the swivel mechanism comprises an adjustment plate connected to the carriage assembly and having a plurality of holes, and a pin connected to the carriage seat and being moveable to reciprocate into one of the plurality of holes to lock the carriage seat in a position relative to the carriage assembly.

5. The collapsible boarding device of claim 3 wherein the swivel mechanism comprises a ring gear connected to the carriage seat, a worm gear connected to the carriage assembly that interfaces with the ring gear, a shaft connected to the worm gear and a crank connected to the shaft to rotate the worm gear whereby rotation of the worm gear translates to rotation of the carriage seat relative to the carriage assembly.

6. The collapsible boarding device of claim 1 wherein the drive mechanism comprises a cable or cord connected to the carriage assembly and wound on a winch that is operable to take in and let out the cable or cord to move the carriage assembly.

7. The collapsible boarding device of claim 1 wherein the tubular members each comprises a male end with a spring-loaded button, and a female end operable to receive the male end of an adjacent tubular member, the female end including a hole configured to receive the spring-loaded button of said male end.

8. The collapsible boarding device of claim 1 wherein the carriage assembly further comprises wheels that roll on the top surface of the parallel rails.

9. The collapsible boarding device of claim 1 further comprising a tilt mechanism between the carriage assembly and the carriage seat to enable the carriage seat to tilt relative to the carriage assembly in a vertical plane to enable the carriage seat to be oriented upright independent of the ramp member.

10. A collapsible boarding device for use in boarding a person onto a seat in an aircraft or vehicle, comprising:

a ramp member with a first end and a second end, the ramp member comprising two parallel rails, each rail of the parallel rails comprising a plurality of tubular members releasably connected end to end to enable disassembly of the parallel rails;

a top mount releasably connected to the parallel rails at the first end, the top mount being operable to engage a portion of a floor of the aircraft or vehicle adjacent the seat;

a bottom mount releasably connected to the parallel rails at the second end and being operable to engage a surface near the aircraft or vehicle;

a carriage assembly releasably mounted on the parallel rails, the carriage assembly being configured to travel along the parallel rails on a top surface of the parallel rails, the carriage assembly further being configured to envelop a bottom surface of the parallel rails to impede unintentional disengagement of the carriage assembly from the parallel rails;

a drive mechanism cooperating with the carriage assembly to move the carriage assembly;

a carriage seat connected to the carriage assembly to support the person, the carriage seat comprising a backrest and side support panels, a hinge connecting each side support panel to the carriage seat to enable each side support panel to be folded down into coplanar alignment with a seat surface of the carriage seat, and a side panel latching mechanism to selectively engage and disengage each side support panel to the backrest;

the backrest is foldable toward the seat surface, and each side support panel is further foldable toward the seat surface to enable the carriage seat to collapse for storage; and wherein the collapsible boarding device may be collapsed for storage when the carriage assembly, the top mount, and the bottom mount are each released from the parallel rails, and the parallel rails are disassembled into the plurality of tubular members.

11. The collapsible boarding device of claim 10 wherein the carriage seat includes a foldable footrest configured to fold underneath the seat surface to enable the carriage seat to collapse for storage.

12. The collapsible boarding device of claim 10 further comprising a swivel mechanism between the carriage assembly and the carriage seat to enable the carriage seat to swivel relative to the carriage assembly in a horizontal plane.

13. The collapsible boarding device of claim 12 wherein the swivel mechanism comprises an adjustment plate connected to the carriage assembly and having a plurality of holes, and a pin connected to the carriage seat and being moveable to reciprocate into one of the plurality of holes to lock the carriage seat in a position relative to the carriage assembly.

14. The collapsible boarding device of claim 12 wherein the swivel mechanism comprises a ring gear connected to the carriage seat, a worm gear connected to the carriage assembly that interfaces with the ring gear, a shaft connected to the worm gear and a crank connected to the shaft to rotate the worm gear whereby rotation of the worm gear translates to rotation of the carriage seat relative to the carriage assembly.

15. The collapsible boarding device of claim 10 wherein the drive mechanism comprises a cable or cord connected to the carriage assembly and wound on a winch that is operable to take in and let out the cable or cord to move the carriage assembly.

16. The collapsible boarding device of claim 10 wherein the tubular members each comprises a male end with a spring-loaded button, and a female end operable to receive the male end of an adjacent tubular member, the female end including a hole configured to receive the spring-loaded button of said male end.

17. The collapsible boarding device of claim 10 wherein the carriage assembly further comprises wheels that roll on the top surface of the parallel rails.

18. The collapsible boarding device of claim 10 further comprising a tilt mechanism between the carriage assembly and the carriage seat to enable the carriage seat to tilt relative to the carriage assembly in a vertical plane to enable the carriage seat to be oriented upright independent of the ramp member.

* * * * *